United States Patent
Ding et al.

(10) Patent No.: US 9,542,048 B2
(45) Date of Patent: Jan. 10, 2017

(54) TOUCH DISPLAY PANEL AND TOUCH DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN)

(73) Assignees: BOE Technology Group Co., Ltd., Beijing (CN); Beijing BOE Optoelectronics Technologies Co., Ltd., Beijing (CN)

(*) Notice: Subject to any disclaimer, the term of this patent is extended or adjusted under 35 U.S.C. 154(b) by 65 days.

(21) Appl. No.: 14/404,801

(22) PCT Filed: Dec. 10, 2013

(86) PCT No.: PCT/CN2013/089012
§ 371 (c)(1),
(2) Date: Dec. 1, 2014

(87) PCT Pub. No.: WO2015/032139
PCT Pub. Date: Mar. 12, 2015

(65) Prior Publication Data
US 2016/0011687 A1    Jan. 14, 2016

(30) Foreign Application Priority Data

Sep. 6, 2013 (CN) .......................... 2013 1 0404512

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 3/0416* (2013.01); *G06F 2203/04103* (2013.01)

(58) Field of Classification Search
CPC ................. G06F 3/0412; G06F 3/0416; G06F 2203/04103
(Continued)

(56) References Cited

U.S. PATENT DOCUMENTS

2009/0256821 A1   10/2009 Mamba et al.
2013/0147724 A1*   6/2013 Hwang ................. G06F 3/0412
                                                    345/173
(Continued)

FOREIGN PATENT DOCUMENTS

CN    102955637 A    3/2013
CN    102999217 A    3/2013
(Continued)

OTHER PUBLICATIONS

International Search Report, International Preliminary Report on Patentability and Written Opinion of the International Searching Authority of PCT/CN2013/089012 in Chinese, mailed Jun. 25, 2014.
Chinese Office Action of Chinese Application No. 201310404512.X, mailed Nov. 4, 2015 with English translation.
English Translation International Search Report of PCT/CN2013/089012 published in English Mar. 12, 2015.
English translation of the International Preliminary Report on Patentability and Written Opinion of the International Searching Authority of PCT/CN2013/089012, issued Mar. 8, 2016.

*Primary Examiner* — Carolyn R Edwards
(74) *Attorney, Agent, or Firm* — Collard & Roe, P.C.

(57) ABSTRACT

Embodiments of the present disclosure provide a touch display panel and a touch display apparatus, which can reduce a width of a bezel of the touch display apparatus and meet a requirement for a narrow bezel of the touch display apparatus. The touch display panel comprises: a plurality of first electrode lines disposed in a first direction; a FPC located above or below a display area; and first electrode wirings each electrically connected to the respective first electrode line correspondingly, wherein each of the first electrode wirings is led from a side of the display area which is close to the FPC and is electrically connected to the FPC.

(Continued)

In this solution according to the embodiment of the present disclosure, each of the first electrode wirings is directly led from the side of the display area which is close to the FPC and would not occupy a width of a bezel; therefore the bezel of the touch display apparatus can be designed as narrower, which greatly meets the requirement for the narrow bezel of the touch display apparatus.

18 Claims, 3 Drawing Sheets

(58) Field of Classification Search
USPC .................................................. 345/174–184
See application file for complete search history.

(56) References Cited

U.S. PATENT DOCUMENTS

2013/0328800 A1* 12/2013 Pu ........................... G06F 3/041
345/173
2014/0125626 A1  5/2014 Yang et al.

FOREIGN PATENT DOCUMENTS

| CN | 202887154 U | 4/2013 |
| CN | 103164076 A | 6/2013 |
| CN | 203480484 U | 3/2014 |
| JP | 2009-258888 A | 11/2009 |

* cited by examiner 51 first substrate
53 plate-type common electrode layer
52 slit-type pixel electrode layer
54 second substrate

TOUCH DISPLAY PANEL AND TOUCH DISPLAY APPARATUS

CROSS REFERENCE TO RELATED APPLICATIONS

This application is the National Stage of PCT/CN2013/089012 filed on Dec. 10, 2013, which claims priority under 35 U.S.C. §119 of Chinese Application No. 201310404512.X filed on Sep. 6, 2013, the disclosure of which is incorporated by reference.

TECHNICAL FIELD

The present disclosure relates to a field of touch display technique, and in particular to a touch display panel and a touch display apparatus.

BACKGROUND

As compared with a keyboard and a mouse, a touch display panel provides better convenience to users as an inputting media. In various touch display panel, a mutual-capacitance touch display panel is more and more popular in consumers because of its advantages of high sensitivity and multi-point array touching.

The mutual-capacitance touch display panel comprises a group of driving electrode lines and a group of detecting electrode lines disposed as being intersected and insulated with each other, and it needs (m+n) electrode wirings to be electrically connected to a Flexible Printed Circuit (FPC) if there are n driving electrode lines and m detecting electrode lines, wherein n is a natural number being greater than 1, and m is a natural number being greater than 1. Its basic principle is as follows: applying a voltage to the driving electrode line and detecting a variation in a signal on the detecting electrode line. An X-direction coordinate is determined by the driving electrode line while a Y-direction coordinate is determined by the detecting electrode line. As detecting, the driving electrode lines in the X-direction are scanned row-by-row, the signal on each of the detecting electrode lines is read when each row of driving electrode lines is scanned, and all intersection points at each row and column can be scanned by one round of scanning, and thus m*n signals are obtained totally. Such a detection method can determine coordinates of a plurality of points in detail, and therefore a multi-point touch can be realized. Its equivalent circuit model comprises, as illustrated in FIG. 1, a signal source 101, a resistance 103 of a driving electrode line, a mutual-capacitance 102 between the driving electrode line and a detecting electrode line, a parasitic capacitance 104 between the driving electrode line, the detecting electrode line and a common electrode layer, a resistance 105 of the detecting electrode line, and a detection circuit 106. When a finger touches, a part of current flows into the finger, which is equivalent to the change in the mutual-capacitance between the driving electrode line and the detecting electrode line, so that the coordinates of the multiple points can be determined by detecting a slight change in the current caused thereby at a detection end.

As illustrated in FIG. 2, in an existing touch display panel, each of the driving electrode lines 11 is electrically connected to the FPC 15 below a display area 14 via a respective electrode wiring 13 located in a bezel area 12. The issue in the know panel is in that the electrode wirings are disposed in the bezel area and occupy a certain width of the bezel, which impairs a trend of narrow bezel for the touch display apparatus and can not meet the requirements for a narrow bezel of the touch display apparatus.

SUMMARY

The present disclosure provides a touch display panel and a touch display apparatus, which can reduce a width of a bezel of the touch display apparatus and meet a requirement for a narrow bezel of the touch display apparatus.

An embodiments of the present disclosure provides a touch display panel comprising:

a plurality of first electrode lines disposed in a first direction;

a Flexible Printed Circuit (FPC) board located above or below a display area; and first electrode wirings each electrically connected to each of the first electrode lines respectively, wherein each of the first electrode wirings is led from a side of the display area which is close to the FPC board and is electrically connected to the FPC board.

In this solution, each of the first electrode wirings is directly led from the side of the display area which is close to the FPC and would not occupy a width of a bezel; therefore the bezel of the touch display apparatus can be designed as narrower, which greatly meets the requirement for the narrow bezel of the touch display apparatus.

Optionally, the touch display panel is an integrated type touch display panel with an ADS display mode, and comprises a first substrate and a second substrate which are located oppositely, wherein:

the first substrate comprises a plate-type common electrode layer comprising the plurality of first electrode lines and a slit-type pixel electrode layer located above the common electrode layer; and the second substrate comprises a plurality of second electrode lines disposed as being intersected with the plurality of first electrode lines.

In the present solution, the plurality of first electrode lines not only function as a main structure part for realizing a touch function, but also function as the plate-type common electrode layer for an ADS-mode display. As compared with an add-on type touch display panel, the integrated type touch display panel is advantageous because of its thinner thickness, higher performance and lower cost, and the integrated type touch display panel with the ADS display mode further has advantages of high resolution, high transmittance, low power consumption, wide angle of view, high aperture ratio, low chromatic aberration, no push Mura, etc.

Optionally, the first substrate further comprises a plurality of data lines disposed in a second direction intersected with the first direction; the first electrode wirings are disposed in a same layer as the plurality of data lines and are parallel to the plurality of data lines, and each of the first electrode wirings is electrically connected to the respective first electrode line via a via-hole structure in a first insulation layer. In this structure, the first electrode wirings and the data lines are located in a same layer, without adding the thickness of the touch display panel, which is benefit for a thinning trend of the touch display panel.

Optionally, the first electrode wiring and the data line are made of a same material. The first electrode wiring and the data line in this structure can be manufactured during a same patterning process, without increasing the usage of the masking and the complexity of the process; therefore it is benefit for saving a manufacture cost.

Optionally, the number of the via-holes in each of the via-hole structures in the first insulation layer is at least two.

The at least two via-holes not only can ensure a good conductivity between the first electrode wiring and its corresponding first electrode line, but also is helpful to decrease an impedance of the first electrode line.

Optionally, the first substrate further comprises a plurality of gate lines and a plurality of second electrode wirings disposed in the first direction, wherein the plurality of gate line, the plurality of second electrode wirings and the plurality of data lines define a plurality of sub-pixel units arranged in a matrix, each of the first electrode wirings is located between two adjacent columns of the sub-pixel units; the plurality of second electrode wirings and the plurality of gate lines are disposed in a same layer, and each of the second electrode wirings is located opposite the respective one of the first electrode lines and both of them are electrically connected with each other via a via-hole structure in a second insulation layer.

In this solution, the plurality of gate lines, the plurality of second electrode wirings, the plurality of data lines and the plurality of first electrode wirings form a grid structure, which can reduce the impedance of the first electrode line; further, the second electrode wiring and the gate line are located in a same layer, without adding the thickness of the touch display panel.

Optionally, the plurality of gate lines forms a plurality of groups in a dual-gate structure.

Optionally, the plurality of gate lines and the plurality of second electrode wirings are made of a same material. The second electrode wirings and the gate lines can be manufactured during a same patterning process, without increasing the usage of the masking and a complexity of the process; therefore it is benefit for saving a manufacture cost.

Optionally, for each of the first electrode wirings, a connection wire is correspondingly disposed in a connection area of the FPC, and each of the first electrode wirings is electrically connected to the respective connection wire via a via-hole structure in a third insulation layer. When the first electrode wirings and the data lines are formed during the same patterning process, such a structure enables the first electrode wiring to avoid contacting the wirings of the data lines and gate lines and to prevent a short-circuit from occurring, so that an electrical reliability of a product is further ensured.

Optionally, in the touch display panel described above, the first direction and the second direction are perpendicular to each other: the first direction is horizontal while the second direction is vertical; or the first direction is vertical while the second direction is horizontal.

Optionally, in the touch display panel described above, the first electrode line is a driving electrode line while the second electrode line is a detecting electrode line; or the first electrode line is the detecting electrode line while the second electrode line is the driving electrode line.

Optionally, in the touch display panel described above, the first substrate is an array substrate while the second substrate is a color filter substrate.

Optionally, in the touch display panel described above, every three columns of sub-pixel units form a group, and one first electrode wiring is disposed between two adjacent groups; or, every six columns of sub-pixel units form a group, and one first electrode wiring is disposed between two adjacent groups.

Another embodiment of the present disclosure further provides a touch display apparatus comprising the touch display panel in any one of embodiments described above, which can allow the bezel of the touch display panel to designed as narrower, thus greatly satisfying the requirement for the narrow bezel of the touch display apparatus.

REFERENCE SIGNS

101—signal source; 102—mutual capacitance; 103—resistance of driving electrode line; 104—parasitic capacitance; 105—resistance of detecting electrode line; 106—detection circuit; 11—driving electrode line; 12—bezel area; 13—electrode wiring; 14—display area; 15—FPC; 21—first electrode line; 22—first electrode wiring; 23—data line; 24—via-hole structure in first insulation layer; 25—gate line; 26—second electrode wiring; 27—sub-pixel unit; 28—via-hole structure in second insulation layer; 29—connection wire; 30—via-hole structure in third insulation layer.

DETAILED DESCRIPTION

An embodiment of the present disclosure provides a touch display panel and a touch display apparatus, which can reduce a width of a bezel of the touch display apparatus and meet a requirement for a narrow bezel of the touch display apparatus. In this solution according to the embodiment of the present disclosure, each of the first electrode wirings is directly led from the side of the display area which is close to the FPC and would not occupy a width of a bezel, and therefore the bezel of the touch display apparatus can be designed narrower, which meets the requirement of the user for the narrow bezel of the touch display apparatus. In order to make objects, solutions and advantages of the present disclosure more clear, embodiments of the present disclosure would be explained in detail by means of examples.

Figure 3:
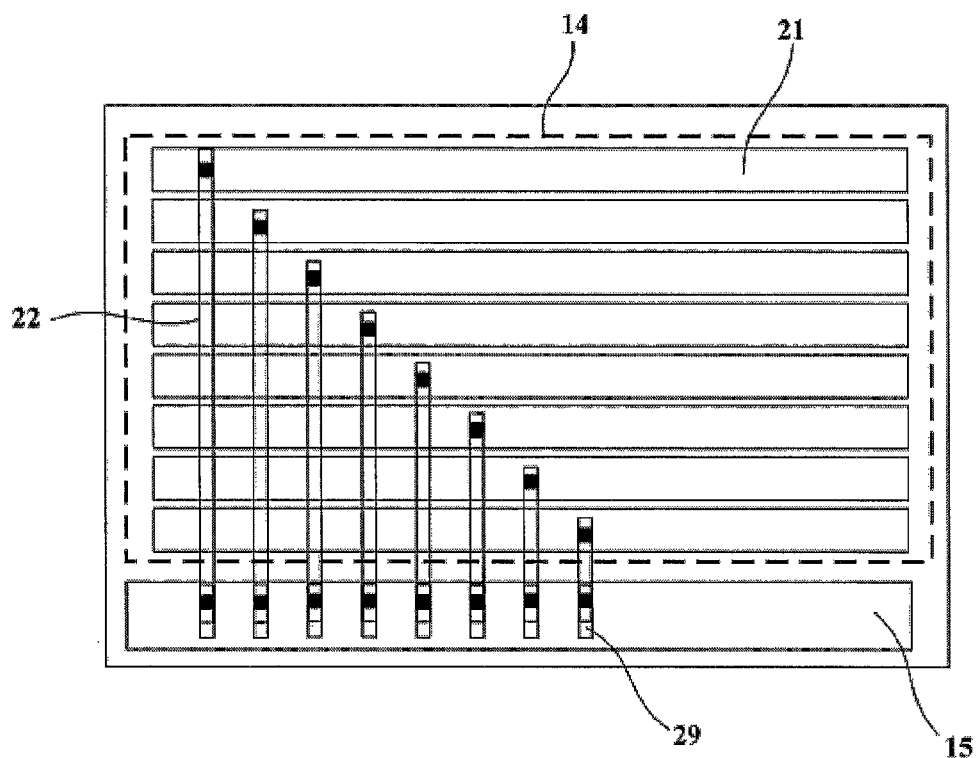
FIG. 3 is an exemplary view illustrating a top view structure of a touch display panel according to an embodiment of the present disclosure.

As illustrated in FIG. 3, a touch display panel according to an embodiments of the present disclosure provides comprises:

a plurality of first electrode lines 21 disposed in a first direction;

a FPC board 15 located below a display area 14; and first electrode wirings 22 each electrically connected to the respective first electrode line 21, wherein each of the first electrode wirings 22 is led from a side of the display area 14 which is close to the FPC 15 and is electrically connected to the FPC 15.

Figure 1:
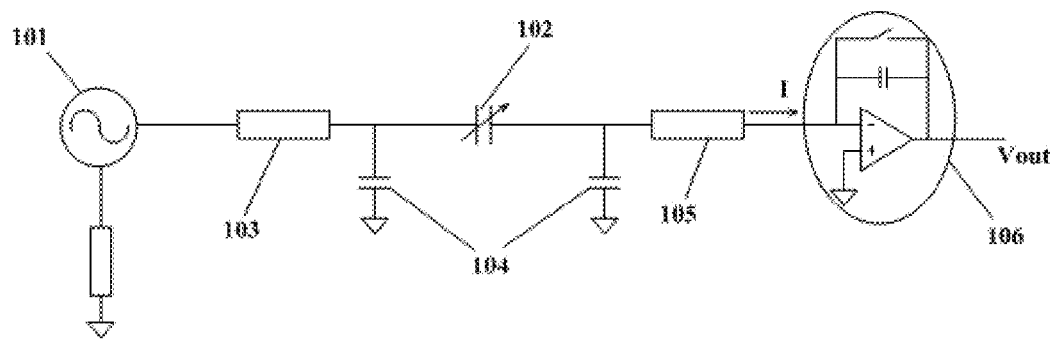
FIG. 1 is an exemplary view illustrating an equivalent circuit model of a mutual-capacitance touch panel.
Figure 2:
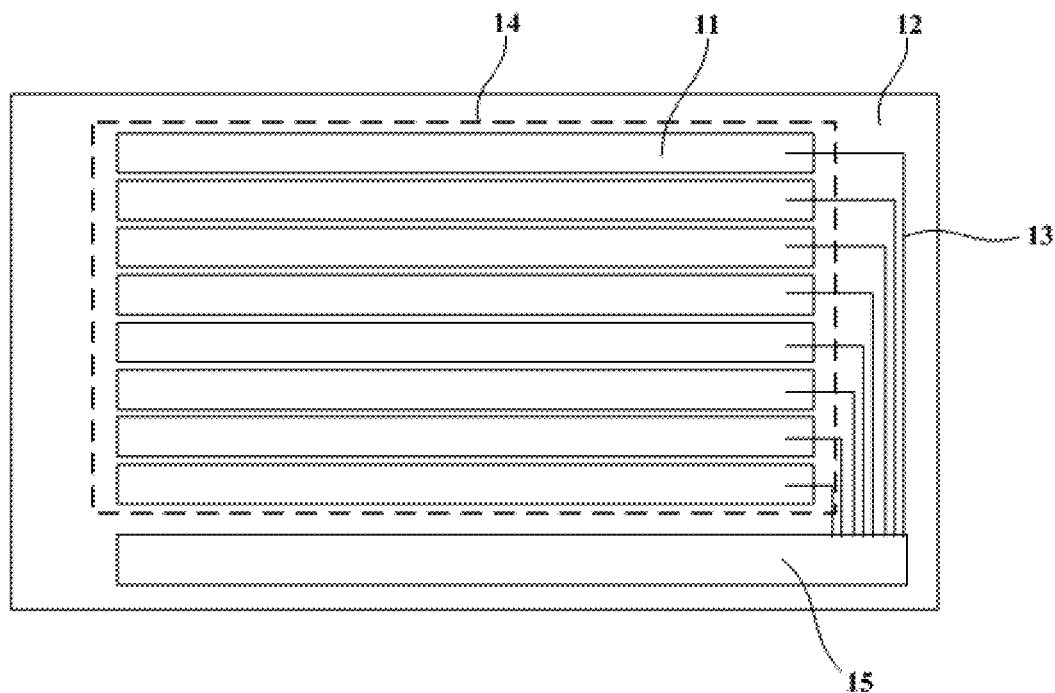
FIG. 2 is an exemplary view illustrating a top view structure of an existing touch display panel.

In this embodiment, there is no limitation on a specific type of the touch display panel, which can be an add-on type (e.g., out-cell type) touch display panel wherein a touch panel and a display screen are manufactured separately and then bonded together or can also be an integrated type (e.g., in-cell/on-cell type) touch display panel in which driving electrode lines and detecting electrode lines for implementing a touch function are disposed on the substrate of the display screen. As known, no matter whether it is the add-on type touch display panel or the integrated type touch display panel, its driving electrode lines are connected to the FPC below the display area through the electrode wirings in the bezel area, which goes against to the design for a narrow bezel design of the touch display apparatus. As compared, in the solution according to the present embodiment, each of the first electrode wirings 22 is directly led from the side of the display area 14 which is close to the FPC 15 and would not occupy a side width of a bezel; therefore the side of the bezel of the touch display apparatus can be designed as narrower (it can be seen from FIG. 3 as well as FIG. 2), which greatly meets the requirement for the narrow bezel of the touch display apparatus.

The first electrode line 21 can be a driving electrode line (at this time, a second electrode line mentioned below would be a detecting electrode line), or can also be the detecting electrode line (at this time, the second electrode line mentioned below would be the driving electrode line). Depending on the specific structure design for the touch display panel, the FPC 15 not only can be disposed above the display area 14 (namely, be close to a top edge of the touch display panel), but also can be disposed below the display area 14 (namely, be close to a bottom edge of the touch display panel), and its specific position is not limited thereto. Each of the first electrode wirings 22 is required to be led from the side of the display area 14 which is close to the FPC 15, but there is not limitation on its specific wiring configuration, as long as the corresponding first electrode line 21 and the FPC 15 can be connected to each other reliably.

Figure 5:
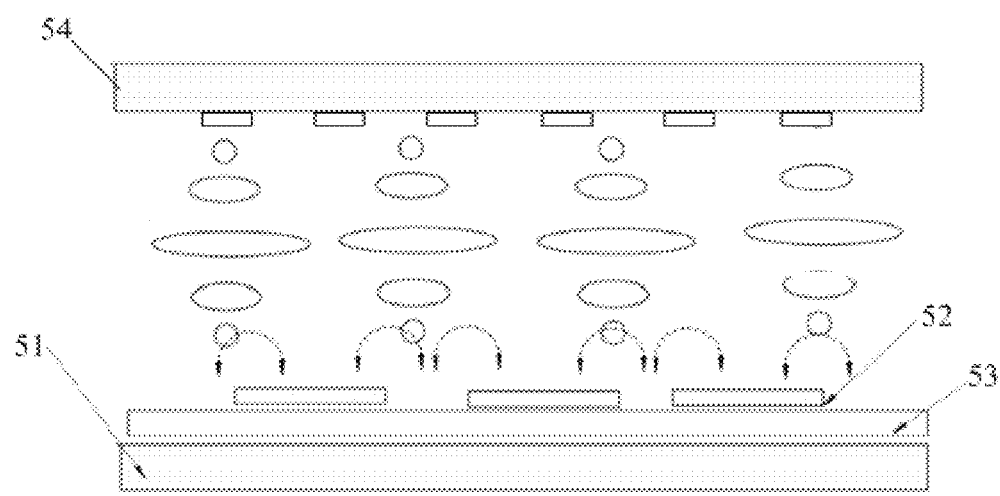
FIG. 5 is a side cross sectional view of the first substrate and the second substrate.

Optionally, the touch display panel is an integrated type touch display panel of an ADS display mode, and comprises a first substrate (referring to FIG. 4) and a second substrate (not shown in drawings) which are located opposite each other, wherein:

As shown in FIG. 5 the first substrate 51 comprises a plate-type common electrode layer comprising the plurality of first electrode lines 21 and a slit-type pixel electrode layer 52 located above the common electrode layer 53; and the second substrate 54 comprises a plurality of second electrode lines (not shown) disposed as being intersected with the plurality of first electrode lines 21.

If the first substrate refers to an array substrate, the second substrate refers to a color filter substrate. In the present solution, the plurality of first electrode lines 21 not only function as a main structure part for realizing a touch function, but also function as the plate-type common electrode layer for an ADS-mode display (Advanced Super Dimension Switch, briefly called as ADS) wherein the ADS-mode is a liquid crystal display mode capable of widening an angle of view, and it can form a multidimensional electrical field with a electrical field generated at an edge of a slit electrode and a electrical field generated between a slit electrode layer and a plate-type electrode layer in a same plane, so that all of liquid crystal molecules in any orientations, between the slit electrodes or just above the electrode in a liquid crystal cell, can be rotated, and thus the work efficiency of the liquid crystal is enhanced and a transmittance efficiency is also improved). As compared with an add-on type touch display panel, the integrated type touch display panel has advantages of thinner thickness, higher performance and lower cost, and the integrated type touch display panel with the ADS display mode further has advantages of high resolution, high transmittance, low power consumption, wide angle of view, high aperture ratio, low chromatic aberration, no push Mura, etc.

Figure 4:
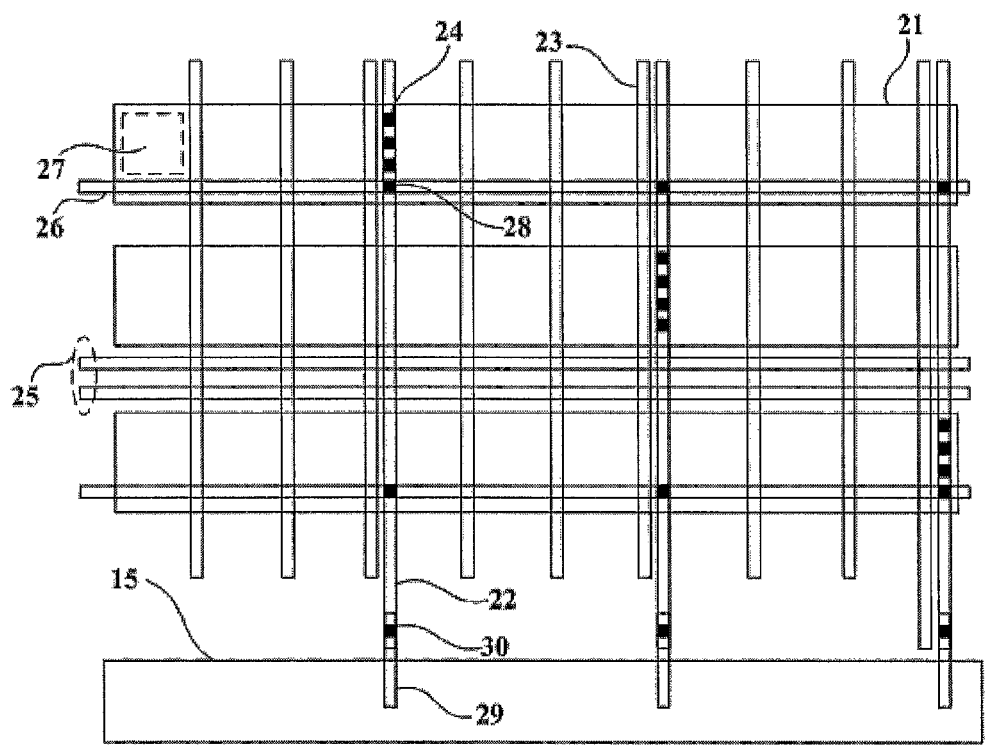
FIG. 4 is an exemplary view illustrating a top view structure of a touch display panel according to another embodiment of the present disclosure.

As illustrated in FIG. 4, the first substrate further comprises a plurality of data line 23 disposed in a second direction intersected with the first direction; each of the first electrode wirings 22 is disposed in a same layer as the plurality of data lines 23 and are parallel to the plurality of data lines 23, and each of the first electrode wirings 22 is electrically connected to the respective first electrode line 21 via a via-hole structure 24 in an insulation layer.

The via-hole structure 24 in the first insulation layer refers to: the first electrode wiring 22 and the data line 23 locate a different layer from the first electrode line 21, they are spaced by the insulation layer on which the via-holes are disposed, and the first electrode wiring 22 and the respective first electrode line 21 are electrically connected at the via-hole. In this structure, the first electrode wirings 22 and the data lines 23 are located in the same layer, without adding the thickness of the touch display panel, which is advantageous to a thinning trend of the touch display panel.

Optionally, the first electrode wiring 22 and the data line 23 are made of a same material. The first electrode wiring 22 and the data line 23 in this structure can be manufactured during a same patterning process, without increasing the usage of the masking and a complexity of the process, and therefore it is benefit for saving a manufacture cost.

There is no limitation on a number of the via-holes in each of the via-hole structures in the first insulation layer, for example, it can be one, two, three and the like. Optionally, the number of the via-holes in each of the via-hole structures 24 in the first insulation layer is at least two. The at least two via-holes not only can ensure a good conductivity between the first electrode wiring 22 and its corresponding first electrode line 21, but also is helpful to decrease of an impedance of the first electrode line 21.

As further illustrated in FIG. 4, the first substrate further comprises a plurality of gate lines 25 and a plurality of second electrode wirings 26 disposed in the first direction, wherein the plurality of gate line 25, the plurality of second electrode wirings 26 and the plurality of data lines 23 define a plurality of sub-pixel units 27 arranged in a matrix, each of the first electrode wirings 22 is located between two adjacent columns of the sub-pixel units 27; the plurality of second electrode wirings 26 and the plurality of gate lines 25 are disposed in a same layer, each of the second electrode wirings 26 is located opposite the respective one of the first electrode lines 21 and they are electrically connected with each other via a via-hole structure 28 in a second insulation layer.

It is required to electrically connect the second electrode wiring 26 with the respective first electrode line 21 by the via-hole structure 28 in the second insulation layer in order to reduce the impedance on the first electrode line 21; further, the second electrode wiring 26 can be electrically connect with the first electrode wiring 22. There is no limitation on specific number and position configured, which are similar to those for the via-hole structure 24 in the first insulation layer and details are not repeated herein. In this embodiment, every three columns of sub-pixel units form a group, and one first electrode wiring 22 is configured between two adjacent groups. It should be noted that an arrangement manner of the first electrode wirings 22 is not limited thereto, for example, every six columns of sub-pixel units can also form one group and one first electrode wiring is configured between two adjacent groups, and the specific arrangement manner is associated with the number of the first electrode wires. In this solution, the plurality of gate lines 25, the plurality of second electrode wirings 26, the plurality of data lines 23 and the plurality of first electrode wirings 22 form a grid structure, which can reduce the impedance of the first electrode line 21 effectively; further, the second electrode wiring 26 and the gate line 25 are located in a same layer, without adding the thickness of the touch display panel. The plurality of gate lines 25 can be a plurality of gate lines in a single gate structure, and can also form a plurality of groups in a dual-gate structure, and the present disclosure is not limited thereto. In the embodiment illustrated in FIG. 4, the plurality of gate lines 25 forms a plurality of groups in a dual-gate structure.

In an example, the plurality of gate lines 25 and the plurality of second electrode wirings 26 are made of a same material: The second electrode wiring 26 and the gate line 25 can be manufactured during a same patterning process, without increasing the usage of the masking and a complexity of the process, and therefore it is benefit for saving a manufacture cost.

As illustrated in FIG. 4, for each of the first electrode wirings 22, a connection wire 29 is correspondingly disposed in a connection area of the FPC 15, and each of the first electrode wirings 22 is electrically connected to the respective connection wire 29 via a via-hole structure 30 in a third insulation layer. The via-hole structure 30 in the third insulation layer is similar to the via-hole structure 24 in the first insulation layer and the via-hole 28 in the second insulation layer, and therefore it would not be described in detail any more herein. When the first electrode wiring 22 and the data line 23 are formed during the same patterning process, such a structure enables the first electrode wiring 22 to avoid contacting the wirings of the data lines and gate lines so as to prevent a short-circuit from occurring, thus an electrical reliability of a product being further ensured.

In an example, the first direction and the second direction are disposed as being intersected. Optionally, the first direction and the second direction in the present embodiment are perpendicular to each other, wherein the first direction can be horizontal while the second direction can be vertical; or the first direction can be vertical while the second direction can be horizontal.

Another embodiment of the present disclosure further provides a touch display apparatus comprising the touch display panel in any one of embodiments described above, whose bezel can be designed as narrower, which greatly meets the requirement for the narrow bezel of the touch display apparatus. The touch display apparatus can be: a liquid crystal panel, electronic paper, an OLED panel, a liquid crystal TV, a liquid crystal display, a digital photo frame, a mobile phone, a tablet computer and any other products or parts with the touch display function.

Obviously, those skilled in the art can make various changes and variations on the present disclosure without departing from the spirit and scope of the present disclosure. Thus, the present disclosure intends to cover the changes and variations to the present disclosure if such changes and variations belong to the scope defined by the claims of the present disclosure and equivalence thereof.

What is claimed is:

1. A touch display panel, comprising:
    a first substrate comprising a plate-type common electrode layer, wherein the plate-type common electrode layer comprises a plurality of first electrode lines disposed in a first direction;
    a Flexible Printed Circuit (FPC) board located above or below a display area; and
    first electrode wirings each electrically connected to each of the first electrode lines respectively, wherein each of the first electrode wirings is led from a side of the display area which is close to the FPC board and is electrically connected to the FPC board;
    wherein the first substrate further comprises a plurality of data lines disposed in a second direction intersected with the first direction; and the first electrode wirings are disposed in a same layer as the plurality of data lines and are parallel to the plurality of data lines, and each of the first electrode wirings is electrically connected to each of the plurality of first electrode lines respectively via a via-hole structure in a first insulation layer.

2. The touch display panel of claim 1, wherein the touch display panel is an integrated type touch display panel with an Advanced Super Dimension Switch (ADS) display mode, and the touch display panel further comprises a second substrate which are located opposite the first substrate, wherein:
    the first substrate further comprises a slit-type pixel electrode layer located above the common electrode layer; and
    the second substrate comprises a plurality of second electrode lines disposed as being intersected with the plurality of first electrode lines.

3. The touch display panel of claim 2, wherein the first electrode line is a driving electrode line while the second electrode line is a detecting electrode line; or
    the first electrode line is the detecting electrode line while the second electrode line is the driving electrode line.

4. The touch display panel of claim 2, wherein the first substrate is an array substrate while the second substrate is a color filter substrate.

5. The touch display panel of claim 1, wherein the first electrode wirings and the data lines are made of a same material.

6. The touch display panel of claim 1, wherein the number of the via-holes in each of the via-hole structures in the first insulation layer is at least two.

7. The touch display panel of claim 1, wherein
    the first substrate further comprises a plurality of gate lines and a plurality of second electrode wirings disposed in the first direction, wherein the plurality of gate line, the plurality of second electrode wirings and the plurality of data lines define a plurality of sub-pixel units arranged in a matrix, and each of the first electrode wirings is located between two adjacent columns of the sub-pixel units;
    the plurality of second electrode wirings and the plurality of gate lines are disposed in a same layer, each of the second electrode wirings is located opposite the respective one of the first electrode lines and both of them are electrically connected with each other via a via-hole structure in a second insulation layer.

8. The touch display panel of claim 7, wherein the plurality of gate lines forms a plurality of groups with a dual-gate structure.

9. The touch display panel of claim 7, wherein the plurality of gate lines and the plurality of second electrode wirings are made of a same material.

10. The touch display panel of claim 7, wherein every three columns of sub-pixel units form a group, and one first electrode wiring is disposed between two adjacent groups; or
    every six columns of sub-pixel units form a group, and one first electrode wiring is disposed between two adjacent groups.

11. The touch display panel of claim 1, wherein
for each of the first electrode wirings, a connection wire is disposed in a connection area of the FPC, and each of the first electrode wirings is electrically connected to a corresponding connection wire via a via-hole structure in a third insulation layer.

12. The touch display panel of claim 1, wherein the first direction and the second direction are perpendicular to each other, wherein
the first direction is horizontal and the second direction is vertical; or
the first direction is vertical and the second direction is horizontal.

13. A touch display apparatus comprising a touch display panel, wherein the touch display panel comprises:
a first substrate comprising a plate-type common electrode layer, wherein the plate-type common electrode layer comprises a plurality of first electrode lines disposed in a first direction;
a Flexible Printed Circuit (FPC) board located above or below a display area; and
first electrode wirings each electrically connected to each of the first electrode lines respectively, wherein each of the first electrode wirings is led from a side of the display area which is close to the FPC board and is electrically connected to the FPC board;
wherein the first substrate further comprises a plurality of data lines disposed in a second direction intersected with the first direction; and the first electrode wirings are disposed in a same layer as the plurality of data lines and are parallel to the plurality of data lines, and each of the first electrode wirings is electrically connected to each of the plurality of first electrode lines respectively via a via-hole structure in a first insulation layer.

14. The touch display apparatus of claim 13, wherein the touch display panel is an integrated type touch display panel with an Advanced Super Dimension Switch (ADS) display mode, and the touch display panel further comprises a second substrate which are located opposite the first substrate, wherein:
the first substrate further comprises a slit-type pixel electrode layer located above the common electrode layer; and
the second substrate comprises a plurality of second electrode lines disposed as being intersected with the plurality of first electrode lines.

15. The touch display apparatus of claim 14, wherein the first electrode line is a driving electrode line while the second electrode line is a detecting electrode line; or
the first electrode line is the detecting electrode line while the second electrode line is the driving electrode line.

16. The touch display apparatus of claim 13, wherein
the first substrate further comprises a plurality of gate lines and a plurality of second electrode wirings disposed in the first direction, wherein the plurality of gate line, the plurality of second electrode wirings and the plurality of data lines define a plurality of sub-pixel units arranged in a matrix, and each of the first electrode wirings is located between two adjacent columns of the sub-pixel units;
the plurality of second electrode wirings and the plurality of gate lines are disposed in a same layer, each of the second electrode wirings is located opposite the respective one of the first electrode lines and both of them are electrically connected with each other via a via-hole structure in a second insulation layer.

17. The touch display apparatus of claim 16, wherein every three columns of sub-pixel units form a group, and one first electrode wiring is disposed between two adjacent groups; or
every six columns of sub-pixel units form a group, and one first electrode wiring is disposed between two adjacent groups.

18. The touch display apparatus of claim 13, wherein
for each of the first electrode wirings, a connection wire is disposed in a connection area of the FPC, and each of the first electrode wirings is electrically connected to a corresponding connection wire via a via-hole structure in a third insulation layer.

* * * * *